(12) United States Patent
Mengle et al.

(10) Patent No.: US 8,706,856 B2
(45) Date of Patent: Apr. 22, 2014

(54) SERVICE DIRECTORY

(75) Inventors: Advay V. Mengle, Bellevue, WA (US); Shawn Murphy, Seattle, WA (US); Jeffrey T. Pearce, Seattle, WA (US); Christopher B. Weare, Bellevue, WA (US); Brian J. Fox, Jr., Redmond, WA (US); Stephen Craig Schertz, North Bend, WA (US)

(73) Assignee: Microsoft Corporation, Redmond, WA (US)

( * ) Notice: Subject to any disclaimer, the term of this patent is extended or adjusted under 35 U.S.C. 154(b) by 768 days.

(21) Appl. No.: 12/943,040

(22) Filed: Nov. 10, 2010

(65) Prior Publication Data

US 2012/0117214 A1    May 10, 2012

(51) Int. Cl.
 *G06F 15/173* (2006.01)
(52) U.S. Cl.
 USPC ............................ 709/223; 709/224; 709/225
(58) Field of Classification Search
 USPC ................................................. 709/223–225
 See application file for complete search history.

(56) References Cited

U.S. PATENT DOCUMENTS

| | | | | |
|---|---|---|---|---|
| 6,167,449 | A  * | 12/2000 | Arnold et al. ................. | 709/227 |
| 7,600,123 | B2 * | 10/2009 | Parupudi et al. .............. | 713/175 |
| 8,302,017 | B2 * | 10/2012 | Kim et al. ..................... | 715/762 |
| 2004/0215754 | A1 * | 10/2004 | Orleth et al. .................. | 709/223 |
| 2006/0230145 | A1 * | 10/2006 | Zarakhovsky et al. ....... | 709/225 |
| 2012/0030316 | A1 * | 2/2012 | Dougherty et al. ........... | 709/219 |
| 2012/0246316 | A1 * | 9/2012 | Ramu et al. ................... | 709/226 |

* cited by examiner

*Primary Examiner* — Krisna Lim
(74) *Attorney, Agent, or Firm* — Bryan Webster; Andrew Sanders; Micky Minhas

(57) ABSTRACT

Service endpoints that provide services to client devices send registration data to a service directory service. The registration data includes addresses that client devices can use to access the service endpoints along with descriptive data that describes the services that each endpoint provides, along with other information such as version numbers of applications that are supported by the service endpoints, and whether the service endpoints are running an experiment. Client devices request a manifest from the service directory service. Each request includes client metadata that describes the requesting client device. The service directory service uses the registration data and the client metadata to generate a manifest for the client device that identifies the services that the client may access and an address that the client may use to access each service.

20 Claims, 6 Drawing Sheets

SERVICE DIRECTORY

BACKGROUND

Service endpoints may implement one or more services, such as Internet-based services, to users and client devices. Because of advancing technology, and a desire to rapidly address security or performance issues that may arise with such services, administrators may want to update the services provided by the service endpoints, add new services to the service endpoints, remove existing services from the service endpoints, and experiment between different implementations of a service. However, because existing client devices may rely on predefined addresses for services, updates or changes made to the existing services may create unexpected problems for client devices that use the services.

SUMMARY

Service endpoints that provide services to client devices send registration data to a service directory service. The registration data includes addresses that client devices can use to access the service endpoints along with descriptive data that describes the services that each endpoint provides and other information (e.g., version numbers of applications that are supported by the service endpoints, and whether the service endpoints are running an experiment, etc.). Client devices that seek to use or receive the services provided by the service endpoints request a manifest from the service directory service. Each request includes client metadata that describes the requesting client device such as a client or group identifier, and versions of applications used by the client device, for example. The service directory service uses the registration data, the client metadata, and information about the service environment, such as the current load, to generate a manifest for the client device that identifies the services that the client may access and an address that the client may use to access each service. The manifest may expire after a predetermined amount of time, after which the client device may request a new manifest from the service directory service. Alternatively or additionally, a service endpoint or the service directory service may force a client device to request a new manifest.

In an implementation, registration data is received from a plurality of service endpoints at a service directory service. The registration data for a service endpoint includes at least one address for the service endpoint and descriptive data related to one or more services provided by the service endpoint. A request for a manifest is received from a client device at the service directory. The request includes client metadata associated with the client device. In response to receiving the request for a manifest, a manifest is generated for the client device using the client metadata and the descriptive data by the service directory service. The generated manifest includes an identifier of one or more of the services and the address of each identified service. The generated manifest is sent to the client device through the network by the service directory service.

In an implementation, a request for a manifest is transmitted to a service directory service from a client device through a network. A manifest is received in response to the request from the service directory service through the network by the client device. The manifest includes identifiers of service endpoints and at least one address for each identified service endpoint. Each address includes one or more tokens for parameter values, and each of the service endpoints is associated with a service. A service is selected by the client device. One or more tokens of the at least one address of the service endpoint associated with the selected service are replaced with corresponding values associated with the client device. The service is requested using the at least one address of the service with the replaced one or more tokens.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Figure 1:
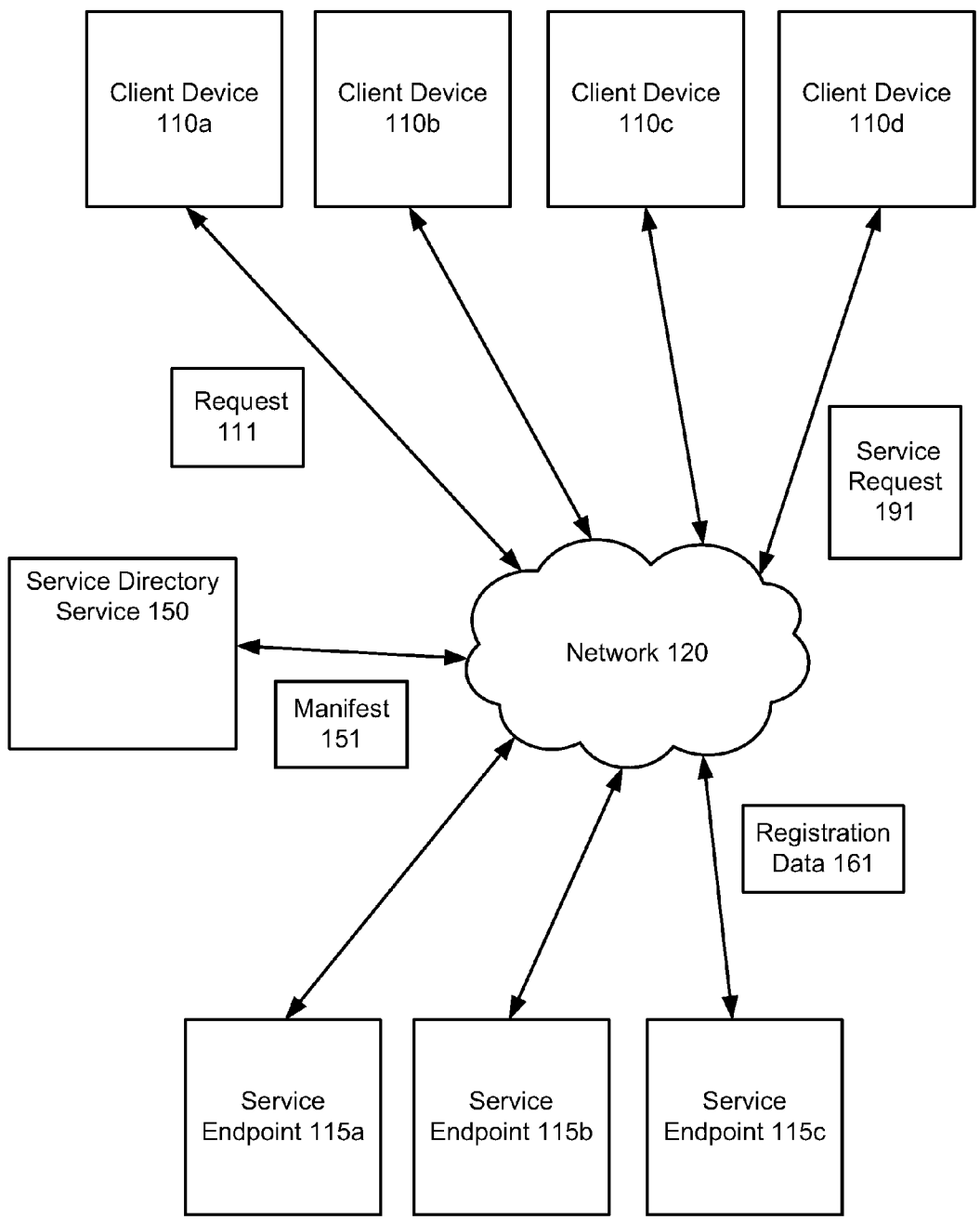
FIG. 1 is an illustration of an example environment using a service directory service.

FIG. 1 is an illustration of an example environment 100 using a service directory service 150. The environment 100 may include a plurality of client devices (e.g., client devices 110a-d), a plurality of service endpoints (e.g., service endpoints 115a-c), and the service directory service 150 in communication with one another through a network 120. The network 120 may be a variety of network types including the public switched telephone network (PSTN), a cellular telephone network, and a packet switched network (e.g., the Internet).

In some implementations, a client device may include a desktop personal computer, workstation, laptop, PDA (personal digital assistant), cell phone, or any WAP (wireless application protocol) enabled device or any other computing device capable of interfacing directly or indirectly with the network 120. A client device may be implemented using a general purpose computing device such as the computing device 600 described with respect to FIG. 6, for example. While only four client devices 110a-d are shown, it is for illustrative purposes only; more or fewer client devices 110a-d may be supported.

The client devices 110a-d may use and/or receive one or more services provided by the service endpoints 115a-c. The services provided by the service endpoints 115a-c may include a variety of services such as web services, printing services, authentication services, data services, storage related services, and application related services, for example. There is no limit to the number of services or types of services that may be supported. Each of the service endpoints 115a-c may provide multiple services or different versions of the same service. For example, a service endpoint 115a may provide a beta version of a service as well as a current version of the service. The services provided by each of the service endpoints 115a-c may be accessed by the client devices 110a-d using a logical address such as a URL (uniform resource locator). Each service endpoint may be implemented using a general purpose computing device such as the computing device 600. While only three service endpoints 115a-c are shown, it is for illustrative purposes only; more or fewer service endpoints may be supported.

Each of the service endpoints 115a-c may register with the service directory service 150 by providing registration data 161. Each of the service endpoints 115a-c may provide their respective registration data 161 when a service endpoint becomes available or when a service endpoint changes, adds, or removes one or more services. In some implementations, the registration data 161 may include identifiers of the services that each service endpoint provides, as well as logical addresses (e.g., URLs) that the client devices 110a-d may use to access the services. Where multiple logical addresses are provided, some of the addresses may be fail-over, or redundant, addresses for use when a service endpoint fails or becomes unavailable. The fail-over addresses may each have an associated rank that indicates an order with which they may be used by a client device to access a service should one or more of the addresses become unavailable. In some implementations, this ranking is a function of an expected relative performance of the multiple addresses.

In some implementations, the registration data 161 may further include description data. The description data may include data that describes the requirements or features of one or more of the offered services. For example, the description data may describe names or versions numbers of applications used by the client devices 110a-d that may be supported by the services, client or group identifiers that identify client devices 110a-d or classes of users that may use the services, locations associated with the services, and experiments that one or more of the services are part of or that the service endpoints 115a-c are implementing. The description data may further indicate the health, current load, and/or maximum capacity of each service or service endpoint 115a-c, as well as load balancing techniques that may be used where multiple addresses are provided for the same service.

In order to learn about the available services provided by the service endpoints 115a-c, each of the client devices 110a-d may send a request 111 for a manifest 151 to the service directory service 150. In some implementations, each request 111 may include client metadata that identifies and describes the client device. For example, the client metadata may include a user identifier, a client device identifier, the software/hardware used by the client device, version numbers of the software or applications used by the client device, a location of the client device, and/or a customer group associated with the client device. The client metadata may further include preferences of the client device, such as types of services that the client device may wish to access or not access. Other types of client metadata may also be included. In some implementations, the client metadata may comprise an XML file. Other data structures or formats may also be used.

The service directory service 150 may receive a request 111 from a client device, and in response to the received request 111, the service directory service 150 may generate a manifest 151 for the client device. In some implementations, a manifest 151 may include an identifier of one or more of the services provided by the service endpoints 115a-c and at least one logical address associated with each service that the client device may use to access the service. The service directory service 150 may generate a manifest 151 for a requesting client device using the client metadata associated with the request 111, the registration data 161 provided by the service endpoints, and other information about the service environment. The service directory service 150 may also consider implicit information gleaned about the client from the received request 111 or the method of communication used by the request, such as the client's IP address when using TCP/IP.

The particular manifest 151 generated for the client device 110a may be different than a manifest 151 generated for the client device 110b for the same service, for example, depending on the client metadata provided by the respective client devices 110a and 110b, and the registration data 161 provided by the service endpoints 115a-c. For example, the client device 110a may use a different version number of an application than the client device 110b, and the service provided by the service endpoint 115a may only support the version of the application used by the client device 110a. Accordingly, the manifest 151 generated for the client device 110a may include a logical address to use for the service provided by the service endpoint 115a that is not included in the manifest 151 that is generated for the client device 110b.

The client devices 110a-d may request services from the service endpoints 115a-c according to their respective manifest 151. Such a request for a service is illustrated in FIG. 1 as the service request 191. In some implementations, a client device may request a service by requesting the service at the logical address provided for that service in the manifest 151. In some implementations, each logical address may include one or more tokens or variables that the client device may replace with corresponding information associated with the client device or associated with the request being made to the service. For example, a logical address may have a token for the identifier of the client device, the version number of an application that the client device is using, or an identifier for a resource the client is requesting from the service. The client device may replace the token for the identifier of the client device with the client device's identifier, may replace the token for the version number of the application with the version number that the client device uses, and/or replace the token(s) used to identify the resource.

In some implementations, each manifest 151 may include an expiration date. After a manifest 151 expires, a client device may request a new manifest from the service directory service 150. A client device may only use services indicated in their manifest 151 at a logical address specified by their manifest 151. Thus, a client device may not use a service or logical address from a previous manifest 151 after a new manifest 151 is received.

In some implementations, a service endpoint or the service directory service 150 may request that a client device update their manifest 151 or request a new manifest 151. For example, when a client device requests a service from a service endpoint, the service endpoint may provide a signal or message indicating that the client device may update its manifest 151. For example, a service endpoint may provide a 410 HTTP "Gone" response indicating that the client device may request a new manifest 151. Alternatively or additionally, the service directory service 150 may message one or more affected client devices 110a-d to update their manifests 151 after one or more service endpoints 115a-c update their registration data 161.

Figure 2:
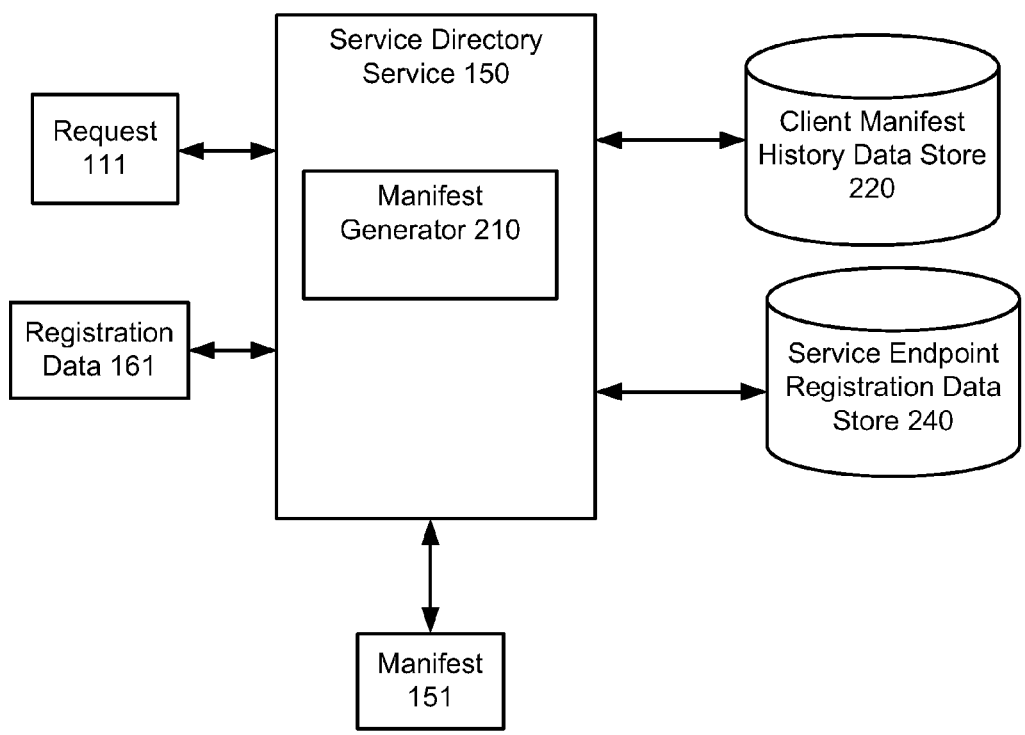
FIG. 2 is an illustration of an example service directory service.

FIG. 2 is an illustration of an example service directory service, such as the service directory service 150. The service directory service 150 includes a manifest generator 210. The service directory service 150 may further access or maintain one or more data stores including a client manifest history data store 220 and a service endpoint registration data store 240. While only one component and two data stores are shown as part of the service directory service 150, it is for illustrative purposes only; more or fewer components and/or data stores may be supported by the service directory service 150.

As described previously, the service directory service 150 may receive registration data 161 from one or more of the service endpoints 115a-c. The service directory service 150 may store the received registration data 161 in the service endpoint registration data store 240. In some implementations, the service endpoint registration data store 240 may overwrite previously received registration data 161 when a service endpoint provides new or updated registration data 161. For example, when a service endpoint removes a service, or upgrades a service to a new version, the service endpoint may provide new registration data 161 to the service directory service 150.

In other implementations, the service endpoint registration data store 240 may maintain a history of the changes made to the registration data 161 by the service endpoints 115a-c. The history of changes made to the registration data 161 may be used as an audit trail for a service endpoint where a user or administrator may view the various changes made to the services offered by the service endpoint over time. Such an audit trail may help the user or administrator diagnose problems with the environment 100, or may determine ways to improve the environment 100 by adding new services or service endpoints 115a-c.

The manifest generator 210 may generate a manifest 151 for a requesting client device according to one or more mapping functions. A mapping function may take some number of inputs, and may output a manifest 151 including identifiers of services and addresses of one or more service endpoints that provide the identified services.

In some implementations, the inputs may include the client metadata associated with the requesting client device and some description of the environment 100 that the service directory service 150 is part of. For example, the description of the environment 100 may include the available service endpoints 115a-c, the overall load of the service endpoints 115a-c, and the number of client devices 110a-d in the environment 100. The description of the environment 100 may be based on the registration data 161 received from each of the service endpoints 115a-c and stored in the service endpoint registration data store 240. Other data may also be included in the inputs such as one or more random numbers and/or a current date and time, or any other arbitrary data.

In some implementations, the inputs used by the manifest generator 210 may include the capabilities and/or preferences of the requesting client device. For example, a client device, as evidenced by the client metadata in the request 111, may be a member of a particular user group, may be associated with a particular region, and/or may support applications having a particular version number. In addition, the client metadata may specify that the client is only interested in accessing a particular type of service. Similarly, one or more services provided by one or more of service endpoints 115a-c, as evidenced by the registration data 161, may be directed to certain user groups, regions, and/or application version numbers. Accordingly, the mapping function may select one or more services for the manifest 151 for the client device whose registration data 161 matches the client metadata of the client device. This way, the client device is only provided with services that the client device is interested in or can use, and the service endpoints 115a-c do not receive requests for services from client devices 110a-d that they do not support.

In some implementations, the inputs to the mapping function used by the manifest generator 210 may include information indicative of the load or health of the various services and/or service endpoints 115a-c. For example, there may be several service endpoints providing the same or similar services to the client devices 110a-d. When a request for a manifest 151 is received, the manifest generator 210 may consider the number of client devices assigned to each service endpoint or the health of each endpoint, and where multiple service endpoints 115a-c provide the same service, the manifest generator 210 may select the service endpoint with the lowest number of assigned client devices or greatest health. Other methods for load balancing may be used, such as round-robin or by randomly selection of a service endpoint using one or more random numbers or a current date or time.

In some implementations, the load on the service endpoints 115a-c may be determined from the stored registration data 161 from the service endpoint registration data store 240. As described previously, the registration data 161 may include the load or number of client devices 110a-d that are accessing the service endpoints 115a-c. Alternatively or additionally, the manifest generator 210 may query one or more of the service endpoints 115a-c to determine their actual load or heath before generating a manifest 151.

In some implementations, the manifest generator 210 may determine one or more of the inputs from the service endpoints 115a-c dynamically when generating a manifest 151, rather than from the service endpoint registration data store 240. For example, upon generating a manifest 151, the manifest generator 210 may query one or more of the service endpoints 115a-d for fail-over addresses, or parts of such addresses, for one or more services, a current load of the one or more services, the health of the one or more services, and/or a current status of the one or more services. A fail-over address may be an address that may be used for a service by a client device in the event that the service is unavailable or unresponsive at the primary address. When querying the service endpoints, the manifest generator 210 may pass on any other inputs the generator would consider, such as the client metadata. The manifest generator 210 may query the service endpoints 115a-c using an address provided by the service endpoints 115a-c in their registration data 161.

In some implementations, the manifest generator 210 may use the mapping function to implement one or more experiments. For example, one or more of the service endpoints 115a-c may wish to conduct an experiment with a particular service. The experiment may be the testing of a new feature in a beta version of an existing service. Accordingly, one or more of the service endpoints 115a-c may specify in the descriptive data of the registration data 161 that a certain percentage of the client devices 110a-d may receive the beta version of the service in their manifest 151, or that certain specified client devices 110a-d may receive the beta version of the service. Accordingly, the manifest generator 210 may add addresses for the beta version and the regular version of the service to generated manifests 151 according to the percentages or parameters described by the experiment, or to generated manifests 151 of the specified client devices 110a-d. In addition, the manifest generator 210 may associate a short expiration date with a generated manifest 151 associated with the experiment.

In some implementations, the manifest generator 210 may use the mapping function to implement one or more service rollouts. For example, one or more of the service endpoints 115a-c may wish to gradually increase the number of client devices 110a-d that use a new service or a new version of a service. Accordingly, one or more of the service endpoints 115*a-c* may specify in the descriptive data of their registration data 161 a maximum number of client devices 110*a-d* that may receive the service. In addition, the descriptive data may further specify a rate at which the number of client devices 115*a-d* that receives the service in their manifest 151 is increased. Accordingly, the manifest generator 210 may add addresses for the service to manifests 151 according to the rate. In some implementations, the manifest generator 210 may monitor the health of the service endpoints 115*a-c* during the service rollout, and may either increase or decrease the rate of the rollout and/or rollback to the older service endpoint depending on the health of the service endpoints 115*a-c*.

In some implementations, the manifest generator 210 may add one or more redundant or fail-over addresses for each service in a manifest 151. In some implementations, each redundant or fail-over address may have a rank or order associated with it that dictates the order with which the client device may use the addresses associated with a service. In some implementations, this ordering is determined by the manifest generator 210 by comparing the relative performance of the multiple addresses.

Upon generation of a manifest 151 by the manifest generator 210 in response to a request 111, the service directory service 150 may transmit the manifest 151 to the requesting client device. In addition, in some implementations, the service directory service 150 may store the generated manifest 151 in the client manifest history data store 220. By storing the generated manifests 151, a user or administrator of a service endpoint may determine which client devices 110*a-d* may be affected by a proposed change to a service or services, or may determine which services are no longer used by client devices 110*a-d*. The client metadata, or a portion thereof, associated with the requests that triggered the generation of each manifest 151 may also be stored in the client manifest history data store 220.

Figure 3:
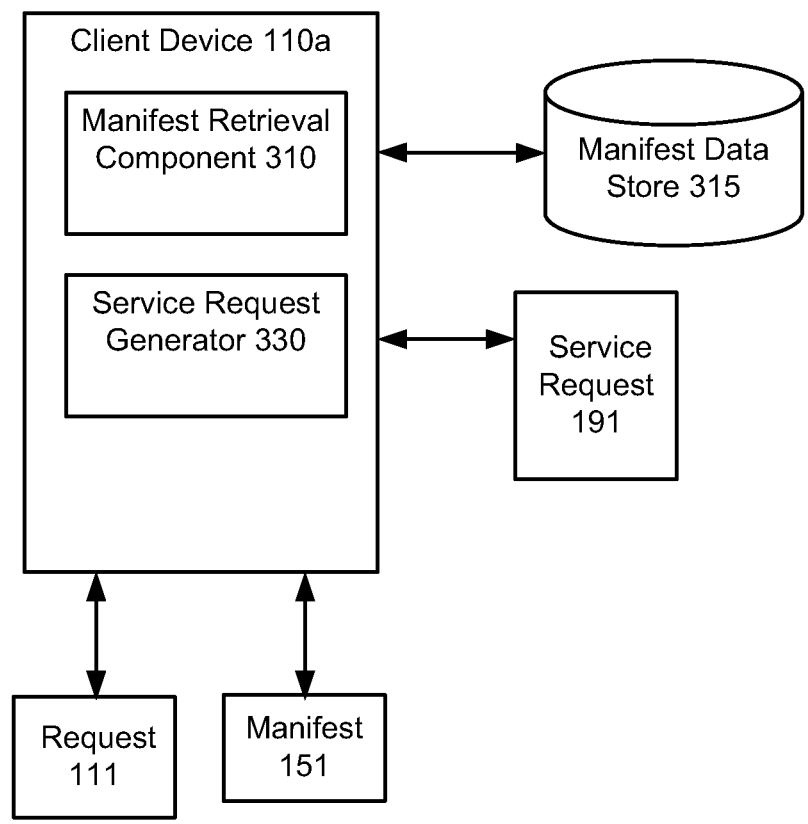
FIG. 3 is an illustration of an example client device.

FIG. 3 is an illustration of an example client device, such as client device 110*a*. The client device 110*a* includes a manifest retrieval component 310 and a service request generator 330. The client device 110*a* may further access and/or maintain one or more data stores including a manifest data store 315. While only two components and one data store are shown as part of the client device 110*a*, it is for illustrative purposes only; more or fewer components and/or data stores may be supported by the client device 110*a* or any client device.

The manifest retrieval component 310 may request a manifest 151 from the service directory service 150. In some implementations, the manifest retrieval component 310 may request a manifest 151 when the client device 110*a* joins or otherwise connects with the environment 100. In some implementations, the manifest retrieval component 310 may periodically request a new manifest 151 to ensure that the client device 110*a* has an updated list of the services available to the client device 110*a*. For example, the client device 110*a* may request a new manifest 151 every day, week, or month, or after rebooting.

In some implementations, the manifest retrieval component 310 may request a new manifest when an expiration date associated with the manifest 151 expires. For example, the manifest retrieval component 310 may periodically check the expiration date of the manifest 151 and may request a new manifest after determining that the manifest 151 has expired. The expiration date may be set by the service directory service 150.

In some implementations, the manifest retrieval component 310 may request a new manifest upon instruction from the service directory service 150 or one or more of the endpoints 115*a-c*. For example, when the client device 110*a* attempts to access a service at an address specified by the manifest 151, the endpoint service associated with the service may return a signal or instruction for the client device 110*a* to request a new manifest 151. The instruction may be an HTTP 410 "Gone" status code. Other signals may also be used.

The manifest retrieval component 310 may receive a manifest 151 from the service directory service 150 in response to a request, and may store the received manifest 151 in the manifest data store 315. In some implementations, any manifests that are stored in the manifest data store 315 are overwritten or replaced by the most recently received manifest. In other implementations, previous versions of the manifest may be stored. However, the client device 110*a* may not access or request services from service endpoints 115*a-c* from previous manifest.

The service request generator 330 may generate a service request 191 to use or access one or more services provided by the service endpoints 115*a-c* according to a manifest 151. In some implementations, an application, or other software component of the client device 110*a* may request a service listed in the manifest 151. In response to the request, the service request generator 330 may retrieve the logical address associated with the requested service in the manifest 151 and may send a service request 191 to access the service to the service endpoint associated with the address.

In some implementations, the service request generator 330 may further replace one or more tokens or parameters in a retrieved address with corresponding values associated with a client device (e.g., the client device 110*a*), or with values corresponding to a requested service or resource. For example, a logical address may include tokens that correspond to a user identifier of a user of the client device 110*a* and a version number of a software application executing on the client device 110*a*. Before requesting the service at the logical address, the service request generator 330 may retrieve the user identifier of the user of the client device 110*a* and the version number of the application and replace the tokens in the logical address with the retrieved values.

In another example, the service request generator 330 may replace one or more tokens in a logical address with values corresponding to a requested service or resource. For example, the service corresponding to the logical address may be a service that returns a set of ratings for a specified media item such as a movie. The logical address may include tokens corresponding to an identifier of the media item, and parameters such as the number of ratings to return. Before requesting the service at the logical address, the service request generator 330 may replace the tokens with the identifier of the media item and the number of ratings to return.

In some implementations, where multiple logical addresses are associated with a selected service, the service request generator 330 may select one of the multiple addresses according to an order. For example, a service may have one or more fail-over addresses that may be used to access the service when a primary address fails. The addresses may have an associated order that is described in the manifest 151 that specifies which of the addresses is the primary address and the order with which the other addresses may be tried by the service request generator 330 should the primary address be unsuccessful.

Figure 4:
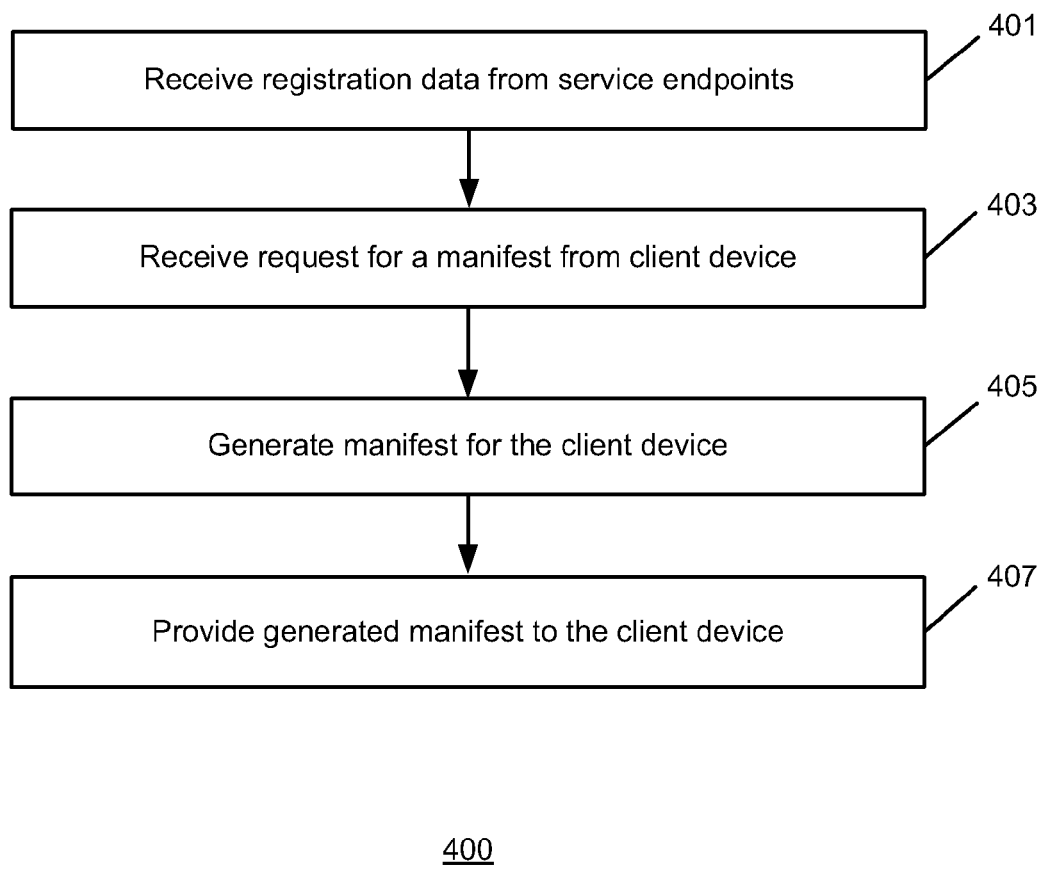
FIG. 4 is an operational flow of an implementation of a method for generating a manifest.

FIG. 4 is an operational flow of an implementation of a method 400 for generating a manifest. The method 400 may be implemented by the service directory service 150, for example.

Registration data is received from a plurality of service endpoints at 401. The registration data may be received by a service directory service 150. In some implementations, the registration data may be received from one or more service endpoints 115a-c. The registration data may include one or more logical addresses of one or more services provided by the service endpoints 115a-c. The registration data may further include descriptive data that describes requirements or guidelines for the client devices 110a-d that may use the services. For example, the registration data may include version numbers of software applications that are compatible with or supported by the services. The registration data may further include an indicator of the overall load of the service endpoints 115a-c and/or whether a service is part of an experiment. Alternatively, or additionally, the registration data for one or more of the endpoints 115a-c may be received from a user or administrator.

A request for a manifest is received from a client device at 403. The request for a manifest may be received by the service directory service 150 from one of the client devices 110a-d. In some implementations, the request may include client metadata. The client metadata may include features and characteristics of the requesting client device such as a client identifier, user identifier, group identifier, and/or version numbers of one or more applications used by the client device. Other client metadata may also be included.

A manifest is generated for the client device at 405. The manifest may be generated by the manifest generator 210 of the service directory service 150. The manifest may be generated by the manifest generator 210 using a mapping function and one or more inputs. In some implementations, the inputs may include the client metadata associated with the client request and the registration data associated with one or more of the service endpoints 115a-c. The inputs may be retrieved from the client metadata and stored registration data, and/or dynamically determined by querying one or more service endpoints 115a-c.

The generated manifest is provided to the client device at 407. The manifest may be provided by the service directory service 150 to the client device that provided the request. The client device may use the received manifest to request and/or access services provided by one of or more of the service endpoints 115a-c whose addresses are included in the generated manifest 151.

Figure 5:
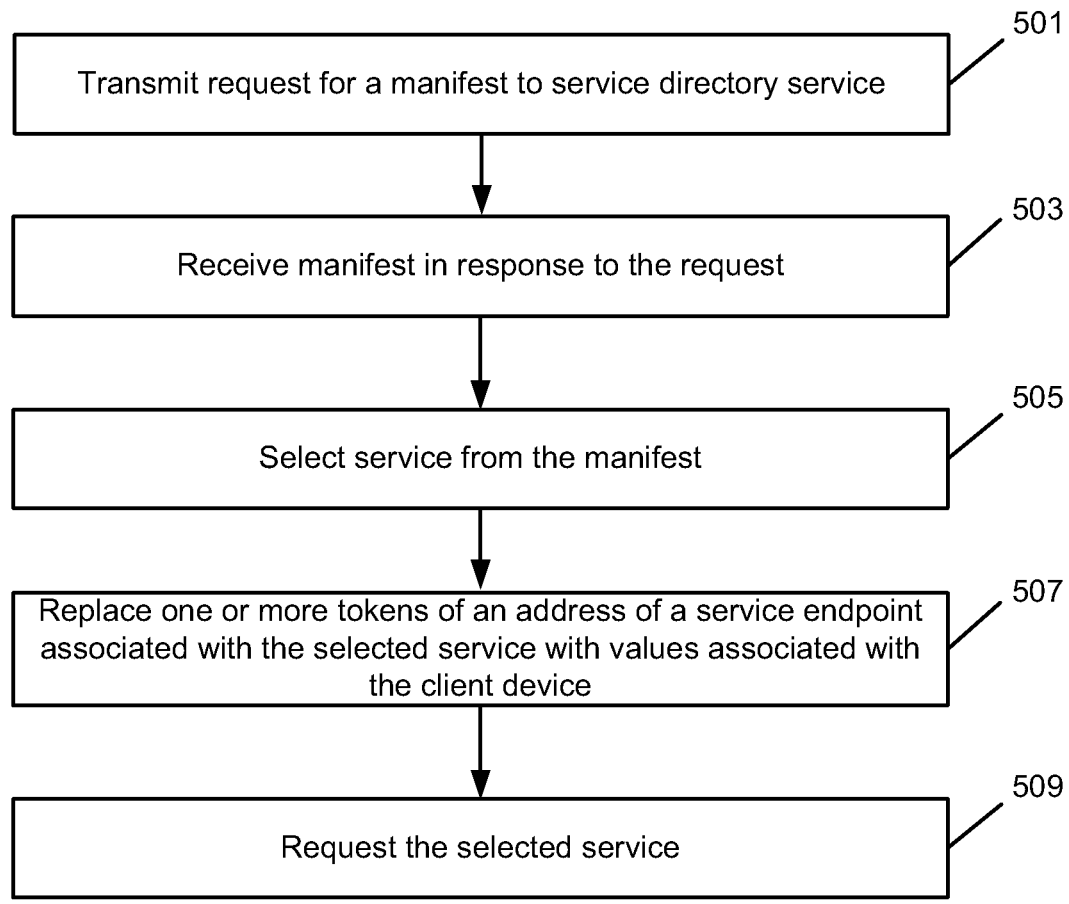
FIG. 5 is an operational flow of an implementation of a method for requesting a manifest and for requesting a service using the manifest.

FIG. 5 is an operational flow of an implementation of a method 500 for requesting a manifest and for requesting a service using the manifest. The method 500 may be implemented by a client device, such as any of the client devices 110a-d, for example.

A request for a manifest is transmitted to a service directory service at 501. The request may be transmitted to the service directory service 150 by the manifest retrieval component 310 of a client device. The request may include client metadata. The client metadata may include information about the client device, such as software or applications used by the client device.

A manifest is received in response to the request at 503. The manifest may be received by the manifest requesting component 310 of the client device. In some implementations, the manifest may identify one or more services provided by one or more of the service endpoints 115a-c, and one or more addresses that the services may be accessed with. In some implementations, one or more of the addresses may have one or more tokens or placeholders. The tokens or placeholders may correspond to features or attributes of the client device. For example, a token may correspond to a client identifier, user identifier, or version number of a software application used by the client device.

A service is selected from the manifest at 505. The service may be selected by an application executing on the client device. The service may be one of the services listed in the manifest 151, and not a service listed in a previous manifest. The selected service may have one or more logical addresses of service endpoints associated with it. Where multiple addresses are listed for a service, one or more of the multiple addresses may be redundant or fail-over addresses. The manifest may further specify an order with which the addresses for a service may be selected.

One or more tokens of the address of the service endpoint associated with the selected service are replaced with values associated with the client device at 507. The tokens may be replaced by the service request generator 330. In some implementations, the service request generator 330 may replace the tokens with values associated with the client device or the service. For example, the service endpoint request generator 330 may replace the token <client_id> with an identifier of the client device, or may replace the token <media_id> with an identifier of media content that the requested service is to use. In addition, the service request generator 330 may replace the tokens with values such as random numbers or a current date or time. Other tokens and values may be used.

The selected service is requested at 509. The selected service may be requested by the service request generator 330 using the address of the selected service with the replaced tokens. In some implementations, if the request times out or a message is received that the service is unavailable, the service request generator 330 may use one or more of the fail-over addresses associated with the selected service.

Figure 6:
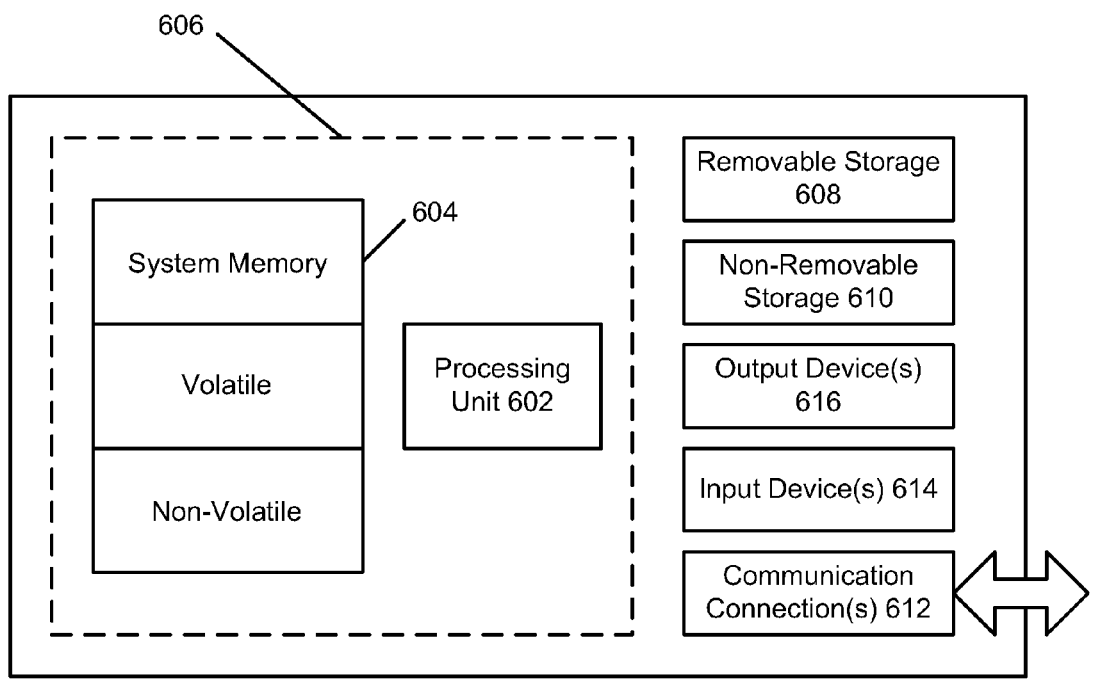
FIG. 6 is a block diagram of an exemplary computing environment.

With reference to FIG. 6, an exemplary system for implementing aspects described herein includes a computing device, such as computing device 600. In its most basic configuration, computing device 600 typically includes at least one processing unit 602 and memory 604. Depending on the exact configuration and type of computing device, memory 604 may be volatile (such as random access memory (RAM)), non-volatile (such as read-only memory (ROM), flash memory, etc.), or some combination of the two. This most basic configuration is illustrated in FIG. 6 by dashed line 606.

Computing device 600 may have additional features/functionality. For example, computing device 600 may include additional storage (removable and/or non-removable) including, but not limited to, magnetic or optical disks or tape. Such additional storage is illustrated in FIG. 6 by removable storage 608 and non-removable storage 610.

Computing device 600 typically includes a variety of computer readable media. Computer readable media can be any available media that can be accessed by computing device 600 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 604, removable storage 608, and non-removable storage 610 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media may be part of computing device 600.

Computing device 600 may contain communications connection(s) 612 that allow the device to communicate with other devices. Computing device 600 may also have input device(s) 614 such as a keyboard, mouse, pen, voice input device, touch input device, etc. Output device(s) 616 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method comprising:
   receiving registration data from a plurality of service endpoints at a service directory service, wherein the registration data for a service endpoint comprises at least one address for the service endpoint and descriptive data related to one or more services provided by the service endpoint;
   receiving a request for a manifest from a client device at the service directory, wherein the request includes client metadata associated with the client device, and the client metadata identifies at least one version number of an application used by the client device;
   in response to receiving the request for a manifest, generating a manifest for the client device using the client metadata and the descriptive data by the service directory service, wherein the generated manifest includes an identifier of one or more services and one or more addresses of service endpoints that provide the identified one or more services; and
   providing the generated manifest to the client device by the service directory service.

2. The method of claim 1, further comprising storing the generated manifest and client metadata associated with the client device by the service directory service.

3. The method of claim 1, wherein the registration data includes one or more fail-over addresses for a service endpoint.

4. The method of claim 1, wherein the descriptive data identifies one or more version numbers supported by each service, and generating a manifest for the client device using the client metadata and the descriptive data by the service directory service comprises generating the manifest for the client device by identifying services that support the at least one version number of the application used by the client device based on the one or more version numbers identified by the descriptive data.

5. The method of claim 1, wherein the descriptive data identifies an experiment, and generating a manifest for the client device using the client metadata and the descriptive data by the service directory service comprises generating the manifest for the client device according to the experiment.

6. The method of claim 1, wherein the descriptive data includes a load level of a service endpoint, and generating a manifest for the client device using the client metadata and the descriptive data by the service directory service comprises generating the manifest for the client device according to the load level of the service endpoint.

7. The method of claim 1, wherein generating a manifest for the client device comprises dynamically requesting the descriptive data from at least one of the service endpoints.

8. The method of claim 1, further comprising:
   receiving the generated manifest at the client device; and
   requesting a service according to the generated manifest.

9. The method of claim 8, further comprising:
   receiving a message directing the client device to request a new manifest; and
   sending a request for a new manifest to the service directory service in response to the message.

10. The message of claim 9, wherein the message is received from a service endpoint or the service directory service.

11. A method comprising:
   sending a request for a manifest to a service directory service from a client device, wherein the request includes client metadata;
   receiving a manifest in response to the request from the service directory service by the client device, wherein the manifest includes identifiers of a plurality of services, at least one address for each identified service, and each of the addresses includes one or more tokens;
   selecting a service by the client device;
   replacing the one or more tokens of the at least one address of the selected service with values from the client device corresponding to the tokens by the client device; and
   requesting the service using the at least one address of the service with the replaced one or more tokens by the client device.

12. The method of claim 11, further comprising:
   determining that the manifest has expired based on an expiration date associated with the manifest; and
   sending a request for a new manifest to the service directory service in response to determining the manifest has expired.

13. The method of claim 11, further comprising:
   receiving a message to request a new manifest; and
   sending a request for a new manifest to the service directory service in response to the message.

14. The method of claim 13, wherein the message is received from one of the service directory service or a service endpoint.

15. The method of claim 11, wherein the at least one address is a URL (uniform resource locator).

16. A system comprising:
   at least one computing device; and
   a service directory service adapted to:
      receive registration data from a plurality of service endpoints, wherein the registration data for a service endpoint comprises at least one address for the service endpoint and descriptive data related to a service provided by the service endpoint;

receive a request for a manifest from a client device, wherein the request includes client metadata associated with the client device, and the client metadata identifies at least one version number of an application used by the client device;

in response to receiving the request for a manifest, generate a manifest for the client device using the client metadata and the descriptive data, wherein the generated manifest includes an identifier of one or more services and one or more addresses of service endpoints that provide the identified one or more services; and provide the generated manifest to the client device.

17. The system of claim 16, wherein the service directory service is further adapted to store the generated manifest and client metadata associated with the client device.

18. The system of claim 16, wherein the registration data includes one or more fail-over addresses for a service endpoint.

19. The system of claim 16, wherein the generated manifest includes an expiration date.

20. The system of claim 16, wherein the one or more addresses are URLs (uniform resource locators).

* * * * *